(12) United States Patent
West et al.

(10) Patent No.: US 9,048,028 B2
(45) Date of Patent: Jun. 2, 2015

(54) HYBRID ELECTROCHEMICAL CELL SYSTEMS AND METHODS

(71) Applicant: G4 Synergetics, Inc., Roslyn, NY (US)

(72) Inventors: Jon K. West, Gainesville, FL (US); Julius Regalado, Gainesville, FL (US); Xin Zhou, Gainesville, FL (US)

(73) Assignee: G4 Synergetics, Inc., Roslyn, NY (US)

( * ) Notice: Subject to any disclaimer, the term of this patent is extended or adjusted under 35 U.S.C. 154(b) by 68 days.

(21) Appl. No.: 13/836,341

(22) Filed: Mar. 15, 2013

(65) Prior Publication Data

US 2014/0272477 A1    Sep. 18, 2014

(51) Int. Cl.
| | |
|---|---|
| *H01M 16/00* | (2006.01) |
| *H01M 10/30* | (2006.01) |
| *H01M 10/34* | (2006.01) |
| *H01G 11/26* | (2013.01) |
| *H01G 9/15* | (2006.01) |

(52) U.S. Cl.
CPC .............. *H01G 11/26* (2013.01); *H01M 10/30* (2013.01); *H01M 10/345* (2013.01); *H01M 16/00* (2013.01); *Y02E 60/124* (2013.01)

(58) Field of Classification Search
USPC .......................................................... 429/9
See application file for complete search history.

(56) References Cited

U.S. PATENT DOCUMENTS

| | | | | |
|---|---|---|---|---|
| 5,419,977 | A | * | 5/1995 | Weiss et al. ................. 429/7 |
| 5,439,756 | A | * | 8/1995 | Anani et al. ................. 429/9 |
| 6,064,178 | A | * | 5/2000 | Miller ........................ 320/117 |
| 7,955,728 | B2 | | 6/2011 | Nakamura |
| 8,263,247 | B2 | | 9/2012 | Kim |
| 2006/0263649 | A1 | * | 11/2006 | Sohn ........................... 429/7 |
| 2009/0148759 | A1 | * | 6/2009 | Mitsuda et al. ........... 429/142 |
| 2010/0028766 | A1 | * | 2/2010 | Peckerar et al. .......... 429/121 |
| 2012/0070736 | A1 | | 3/2012 | Ohara et al. |
| 2012/0115028 | A1 | | 5/2012 | Ueno et al. |

FOREIGN PATENT DOCUMENTS

| | | |
|---|---|---|
| DE | 102005051003 A1 * | 4/2007 |
| JP | 2001351688 A * | 12/2001 |

OTHER PUBLICATIONS

IPDL Machine Translation of the Detailed Description of JP 2001-351688A (Dec. 2001).*

* cited by examiner

*Primary Examiner* — Gregg Cantelmo
(74) *Attorney, Agent, or Firm* — Ropes & Gray LLP

(57) ABSTRACT

Disclosed herein are systems, devices, and methods for a hybrid electrochemical cell which utilizes two different chemistries in the same cell. According to one aspect, the hybrid cell includes a first pair of electrode units which form a first electrochemical cell and a second pair of electrode units, which form a second electrochemical cell. The second electrochemical cell utilizes a different chemistry than the first electrochemical cells, but both chemistries share a common electrolyte. The hybrid cell further comprises a common electrolyte layer provided between each pair of electrodes. In certain implementations, the common electrolyte layer is a single cavity such that the electrolyte is shared between both the first and the second electrochemical cell.

19 Claims, 6 Drawing Sheets

HYBRID ELECTROCHEMICAL CELL SYSTEMS AND METHODS

BACKGROUND

Hybrid batteries typically use several cells of different chemistries connected together by one or more electrical switches. By combining cells of different chemistries, these hybrid batteries aim to provide benefits that would otherwise be impossible with only one type of cell. For example, a primary battery with a relatively large energy density may be combined with a secondary battery that has a relatively low energy density, but is rechargeable. However, the battery chemistries are typically not compatible with each other, and thus require separate physical containers for each cell. This separate housing adds bulk to the overall structure, and some battery chemistries, such as lithium-ion, may require additional puncture-resistant protection surrounding each cell due to their volatility when exposed to oxygen. Furthermore, electrical switches and connections between individual cells may add resistance, and therefore losses in efficiency, to the overall battery.

SUMMARY

Disclosed herein are systems, devices, and methods for a hybrid electrochemical cell which utilizes at least two different chemistries in the same cell. According to one aspect, a hybrid energy storage cell includes a first pair of electrode units which form a first electrochemical sub-cell and a second pair of electrode units, which form a second electrochemical sub-cell. The second electrochemical sub-cell utilizes a different chemistry than the first electrochemical sub-cell. A common electrolyte layer is provided between each pair of electrode units, where the electrolyte is shared between the first and the second electrochemical sub-cells.

In certain implementations, the first pair of electrode units comprises a positive electrochemical electrode unit and an adjacent negative electrochemical electrode unit, the second pair of electrode units comprises a positive electrochemical electrode unit and an adjacent negative electrochemical electrode unit, and each of the electrochemical electrodes units of the same polarity are electrically coupled together in parallel. The positive electrochemical electrode units may be electrically isolated by a separator from the negative electrochemical electrode units. In certain implementations, the first electrochemical sub-cell and the second electrochemical sub-cell are contained in a single package, and the electrolyte layer comprises a single cavity.

In certain implementations, the first electrochemical sub-cell and the second electrochemical sub-cell are electrically coupled in series. In other implementations, the first electrochemical sub-cell and the second electrochemical sub-cell are electrically coupled in parallel. The first electrochemical sub-cell may be configured to operate at a substantially similar voltage range as the second electrochemical sub-cell.

In certain implementations, the second electrochemical sub-cell comprises an electrochemical capacitor. The second electrochemical sub-cell may be configured to discharge at a rate greater than the first electrochemical sub-cell. Furthermore, the first electrochemical sub-cell may be configured to have a greater electrical storage capacity than the second electrochemical sub-cell.

According to one aspect, a hybrid energy storage cell comprises a first pair of electrode units which form a nickel-metal hydride electrochemical sub-cell, a second pair of electrode units which form a carbon electrochemical capacitor, and a common electrolyte layer provided between each pair of electrode units. An alkaline electrolyte is shared between the nickel-metal hydride electrochemical sub-cell and the carbon electrochemical capacitor.

In certain implementations, the first pair of electrode units comprises a first positive electrochemical electrode unit and an adjacent first negative electrochemical electrode unit, the second pair of electrode units comprises a second positive electrochemical electrode unit and an adjacent second negative electrochemical electrode unit, and each of the electrochemical electrodes units of the same polarity are electrically coupled together in parallel. The positive electrochemical electrode units may be electrically isolated by a separator from the negative electrochemical electrode units. In certain implementations, the nickel-metal hydride electrochemical sub-cell and the carbon electrochemical capacitor are contained in a single package, and the electrolyte layer comprises a single cavity.

In certain implementations, the nickel-metal hydride electrochemical sub-cell and the carbon electrochemical capacitor are electrically coupled in series. In other implementations, the nickel-metal hydride electrochemical sub-cell and the carbon electrochemical capacitor are electrically coupled in parallel. The nickel-metal hydride electrochemical sub-cell may be configured to operate at a substantially similar voltage range as the carbon electrochemical capacitor. Furthermore, the carbon electrochemical capacitor may be configured to discharge at a rate greater than the nickel-metal hydride electrochemical sub-cell. In certain implementations, the nickel-metal hydride electrochemical sub-cell may be configured to have a greater electrical storage capacity than the carbon electrochemical capacitor.

According to one aspect, a hybrid energy storage cell comprises means for forming a first electrochemical sub-cell, means for forming a second electrochemical sub-cell, and means for providing a common electrolyte layer between each pair of electrode units. The second electrochemical sub-cell utilizes a different chemical reaction than the first electrochemical sub-cell, and an electrolyte is shared between the first electrochemical sub-cell and the second electrochemical sub-cell.

In certain implementations, the first electrochemical cell comprises a first positive electrochemical electrode unit and an adjacent first negative electrochemical electrode unit, the second electrochemical cell comprises a second positive electrochemical electrode unit and an adjacent second negative electrochemical electrode unit, and each of the electrochemical electrodes units of the same polarity are electrically coupled together in parallel. The positive electrochemical electrode units may be electrically isolated by a separator from the negative electrochemical electrode units. In certain implementations, the hybrid energy storage cell further comprises means for containing the first electrochemical sub-cell and the second electrochemical sub-cell in a single package, wherein the common electrolyte layer comprises a single cavity.

In certain implementations, the first electrochemical sub-cell and the second electrochemical sub-cell are electrically coupled in series. In other implementations, the first electrochemical cell and the second electrochemical sub-cell are electrically coupled in parallel. The first electrochemical sub-cell may be configured to operate at a substantially similar voltage range as the second electrochemical sub-cell.

In certain implementations, the second electrochemical sub-cell comprises an electrochemical capacitor. The second electrochemical sub-cell may be configured to discharge at a rate greater than the first electrochemical sub-cell. Furthermore, the first electrochemical sub-cell may be configured to have a greater electrical storage capacity than the second electrochemical sub-cell.

Variations and modifications will occur to those of skill in the art after reviewing this disclosure. The disclosed features may be implemented, in any combination and subcombinations (including multiple dependent combinations and subcombinations), with one or more other features described herein. The various features described or illustrated above, including any components thereof, may be combined or integrated in other systems. Moreover, certain features may be omitted or not implemented.

BRIEF DESCRIPTION OF THE DRAWINGS

The foregoing and other objects and advantages will be apparent upon consideration of the following detailed description, taken in conjunction with the accompanying drawings, in which like reference characters refer to like parts throughout, and in which.

DETAILED DESCRIPTION

To provide an overall understanding of the systems, devices, and methods described herein, certain illustrative embodiments will be described. Although the embodiments and features described herein are specifically described for use in connection with hybrid electrochemical systems, it will be understood that the systems, devices, and methods described herein can be adapted and modified for any suitable electrochemical application and that such other additions and modifications will not depart from the scope hereof.

As discussed above, hybrid batteries typically use electrochemical cells of different chemistries which are individually packaged into separate physical containers. However, the individual packages add significant bulk to the overall structure, and the need for puncture-resistant casings surrounding each cell for certain battery chemistries, such as lithium-ion, may further increase the size and weight of the battery. Furthermore, electrical switches and connections between individual cells may add resistance, and therefore losses in efficiency, to the overall battery.

The hybrid electrochemical cells as disclosed herein utilize battery chemistries having a common electrolyte. This allows the electrodes of two different electrochemical sub-cells to be packaged into a single container with a common electrolyte which surrounds each of the electrodes. By including two different chemistries in the same cell, the hybrid electrochemical cell can be contained within a smaller package compared to hybrid batteries, which require individual containers for each sub-cell chemistry. Therefore, the hybrid electrochemical cell benefits from a relatively smaller and more convenient container, which also results in cheaper manufacturing costs and higher system robustness.

Furthermore, the hybrid electrochemical cells as disclosed herein provide a direct electrical connection between different sub-cells through the common electrolyte. Compared to the electrical switches and connections in hybrid batteries, the electrolyte provides a relatively small resistance between sub-cells, which results in a relatively more efficient and faster charging battery. The more compact hybrid cell may also benefit from less operational stress for long-term use, which may result in a longer operating lifetime compared to hybrid batteries.

Figure 1:
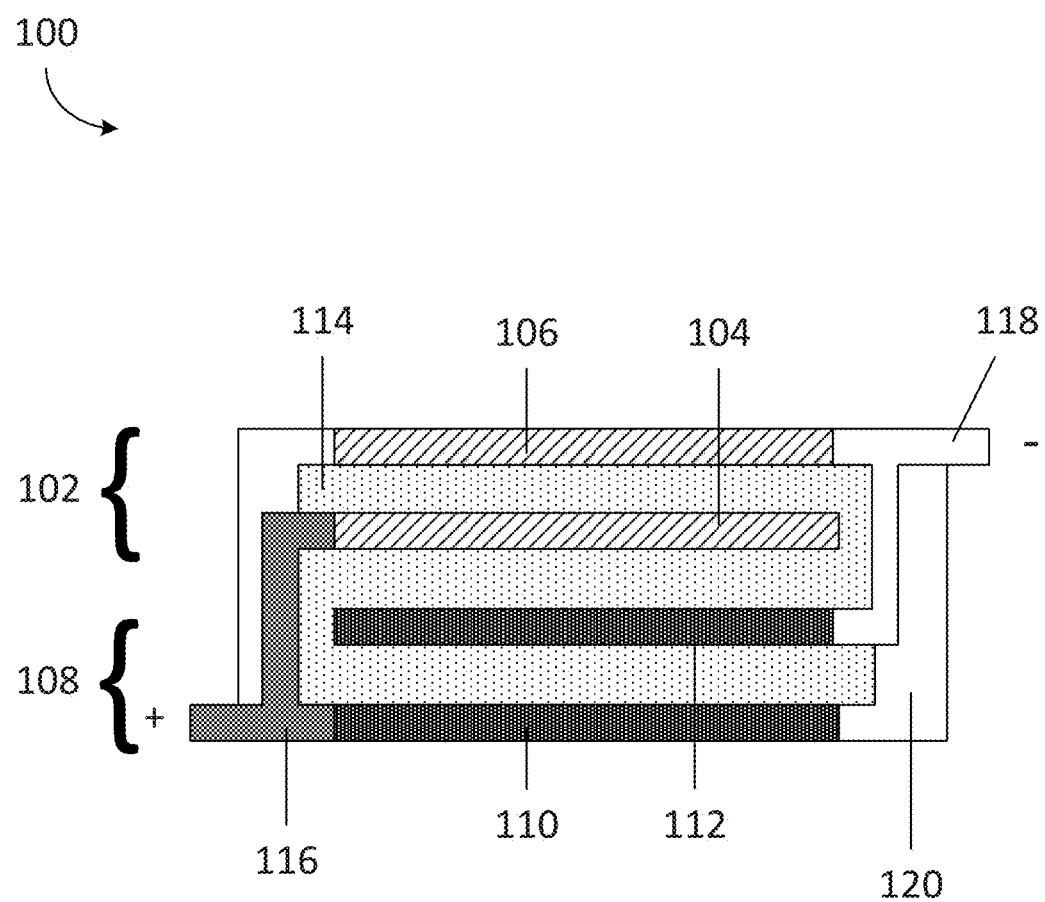
FIG. 1 shows a schematic cross-sectional view of a hybrid electrochemical cell with sub-cells of different chemistries.

FIG. 1 shows a schematic cross-sectional view of a hybrid electrochemical cell 100 with sub-cells of different chemistries according to certain embodiments. The hybrid cell 100 includes a first electrochemical sub-cell 102, a second electrochemical sub-cell 108, an electrolyte cavity 114, a positive electrical terminal 116, a negative electrical terminal 118, and supporting structure 120. In some embodiments, the first electrochemical sub-cell 102 includes a positive electrochemical electrode unit 104 connected to the positive electrical terminal 116 and a negative electrochemical electrode unit 106 connected to the negative electrical terminal 118. In some embodiments, the second electrochemical sub-cell 108 includes a positive electrochemical electrode unit 110 connected to the positive electrical terminal 116 and a negative electrochemical electrode unit 112 connected to the negative electrical terminal 118. Supporting structure 120 may be any suitable structure which substantially encloses the first and second electrochemical sub-cells 102 and 108 and the electrolyte cavity 114. In certain embodiments, the positive electrical terminal 116 and the negative electrical terminal 118 penetrate the supporting structure 120 and provide an electrical connection to the exterior of the hybrid cell 100.

Figure 2:
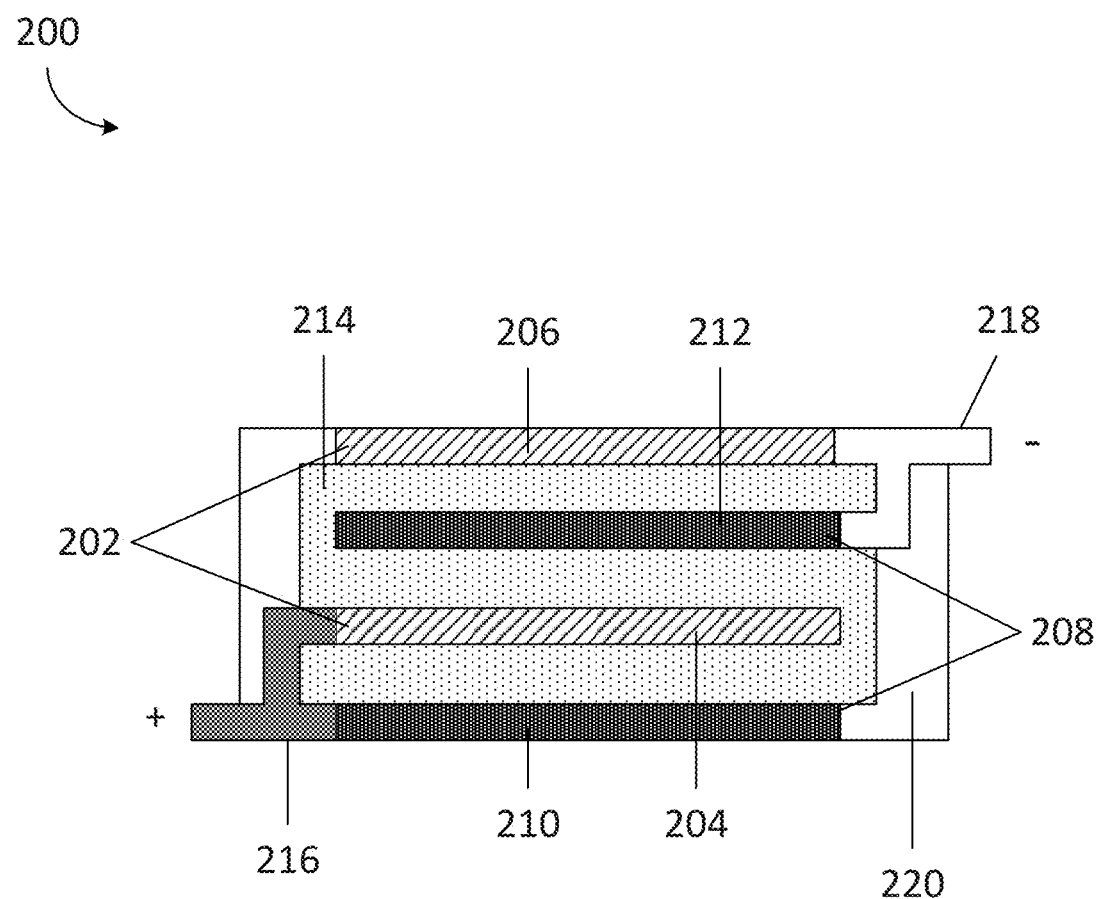
FIG. 2 shows a schematic cross-sectional view of a hybrid electrochemical cell with sub-cells of different chemistries.

Although the first electrochemical sub-cell 102 is shown in FIG. 1 to be wholly arranged apart from the second electrochemical sub-cell 108 in a distinct portion of the hybrid cell 100, this arrangement is shown merely for illustrative purposes, and other geometrical configurations are considered. For example, the positive electrochemical electrode 104 of the first sub-cell 102 may be arranged substantially between the positive and negative electrochemical electrodes 110 and 112 of the second sub-cell 108, as seen in FIG. 2. In certain implementations, the first electrochemical sub-cell 102 is electrically connected to the second electrochemical sub-cell 108 in parallel, as shown in FIG. 1, where the positive electrode 104 of the first electrochemical sub-cell 102 is electrically connected to positive electrode 110 of the second electrochemical sub-cell 108. In certain implementations, the first electrochemical sub-cell 102 may be electrically connected to the second electrochemical sub-cell 108 in series, where the positive electrode 104 of the first electrochemical sub-cell 102 is electrically connected to the negative electrode 112 of the second electrochemical sub-cell 108.

In certain implementations, the first electrochemical sub-cell 102 may use a nickel-metal hydride chemistry. The positive electrode 104 may be composed of nickel oxyhydroxide (NiOOH), and the negative electrode 106 may be composed of a hydrogen-absorbing metal alloy. This alloy may be comprised of a combination of lanthanum, cerium, neodymium, or praseodymium with nickel, cobalt, manganese, or aluminum. Such nickel-metal hydride sub-cells may also use an alkaline electrolyte, such as potassium hydroxide.

In certain implementations, the second electrochemical sub-cell 108 may comprise an electrostatic energy storage sub-cell, such as a capacitor. For example, the second electrochemical sub-cell 108 may be a carbon electrochemical ultracapacitor. While capacitors typically require a solid dielectric that insulates two conducting plates, an ultracapacitor (also known as electrolytic capacitors, electrochemical capacitors, supercapacitors, or electric-double layer capacitors, among others) may utilize a liquid or viscous electrolyte between conducting plates. In some implementations, the ultracapacitor may utilize the same alkaline electrolyte as the nickel-metal hydride electrochemical sub-cell.

An ultracapacitor can achieve some of the highest capacitance values per unit volume and energy densities of any type of capacitor. As an energy storage unit, ultracapacitors are relatively less susceptible to temperature differences than electrochemical batteries. Furthermore, ultracapacitors can also tolerate relatively high numbers of rapid charge and discharge cycles with minimal negative impacts, whereas electrochemical batteries generally exhibit a decrease in electrical capacity and performance with increased cycles. However, ultracapacitors have relatively small electrical capacity and drain relatively quickly when compared with batteries.

Therefore, by combining an electrochemical sub-cell 102, such as a nickel-metal hydride sub-cell, with an ultracapacitor 108 which uses the same alkaline electrolyte, the overall hybrid cell 100 may benefit from the fast discharge rate of the ultracapacitor while maintaining the long-term power from the nickel-metal hydride sub-cell. Furthermore, when the ultracapacitor 108 is not discharging, the electrochemical sub-cell 102 may charge the capacitor for future use. As shown in FIG. 1, the positive electrode 104 of the first electrochemical sub-cell 102 may be electrically connected to the positive electrode 110 of the second electrochemical sub-cell 108 through positive terminal 116. Furthermore, the common electrolyte in electrolyte cavity 114 may provide a medium for ionic transfer between the electrodes of the two electrochemical sub-cells. Due to the close proximity of the two electrochemical sub-cells, the internal "effective series resistance" (ESR) of the battery is relatively low, therefore increasing the speed and efficiency of charging the second electrochemical sub-cell.

The electrolyte cavity 114 may contain any suitable electrolyte which may be used by both the first electrochemical sub-cell 102 and the second electrochemical sub-cell 108. The electrolyte is typically a liquid or viscous material that contains ions which can be decomposed by electrolysis. The electrolyte may promote electron transfer to the electrodes of the first electrochemical sub-cell 102 and the second electrochemical sub-cell 108 through suitable chemical reactions, such as oxidation or reduction reactions. The systems, devices, and methods described herein may apply any suitable electrolyte, including, but not limited to potassium hydroxide, sodium hydroxide, sodium chloride, calcium chloride, $LiPF_6$, $LiBF_4$, $LiClO_4$, or any other suitable electrolyte or combination thereof.

The hybrid electrochemical cells as disclosed herein utilize a common electrolyte which may be used by each of the different battery chemistries within the hybrid cell. The use of a common electrolyte which is compatible with each of the different battery chemistries allows the electrochemical sub-cells to be packaged into a single container. In the illustrative example depicted in FIG. 1, the electrolyte is an alkaline electrolyte such as potassium hydroxide, which completely surrounds the positive and negative electrode terminals 104 and 106 of the first electrochemical sub-cell 102. During discharge, the $OH^-$ ions in the alkaline electrolyte react with the negative electrode 106 to produce a free electron and water. The positive electrode 104 consumes the free electron and produces an $OH^-$ ion. Thus, the alkaline electrolyte is not consumed, but rather facilitates electron by reacting with the positive and negative electrode terminals 104 and 106.

The same alkaline electrolyte may be used by the ultracapacitor 108. When a voltage is applied to the ultracapacitor 108, the ions in the alkaline electrolyte may arrange themselves into two layers of ions at the interface between the electrolyte and each of the positive and negative electrode units 110 and 112, thereby storing charge in the ultracapacitor 104. Thus, the hybrid electrochemical cell 100 may utilize the same alkaline electrolyte in two different ways: (1) as a reactant in the chemical reactions of the first electrochemical sub-cell 102, and (2) as an electrostatic storage medium at the interface with the electrodes of the second electrochemical sub-cell 108. In some embodiments, the alkaline electrolyte may also be used as a chemical reactant in the reactions of the second electrochemical sub-cell 108.

Although FIG. 1 was discussed in relation to a nickel-metal hydride and ultracapacitor combination, the first and second electrochemical sub-cells 102 and 108 may be any electrochemical sub-cell which utilizes a common electrolyte. The systems, devices, and methods described herein may also apply to other battery types, including, but not limited to bipolar cells, prismatic cells, and wound cells, or any other suitable battery type or combination thereof. Furthermore, the systems, devices, and methods herein may apply to cells having any suitable chemistry including, but not limited to lead-acid, nickel-cadmium, lithium-ion, lithium-polymer, and or any other suitable chemistry, or any combinations thereof.

The positive and negative electrode units 104, 106, 110, and 112 of electrochemical cells 102 and 108 may be any suitable electrode units for producing and maintaining an electrical voltage, typically a metal or a semiconductor. For example, in an electrochemical cell, one electrode acts as the anode and loses electrons through oxidation reactions, while the other electrode acts as the cathode and gains electrons through reduction reactions. In certain implementations, the first electrochemical sub-cell 102 and the second electrochemical sub-cell 108 are configured to operate at substantially the same voltage. The electrode units may be any suitable shape, including, but not limited to cylindrical, rectangular, a flat plane, or any other shape or combination thereof. Furthermore, the electrode units for both the first electrochemical sub-cell 102 and the second electrochemical sub-cell 108 may be arranged in any orientation with respect to each other and the electrolyte cavity 114. For example, the negative electrode units and positive electrode units 104, 106, 110, and 112 for both electrochemical sub-cells may be configured as concentric cylinders, where the negative electrodes 106 and 112 are the inner cylinders and the positive electrodes 104 and 110 are outer cylinders. The arrangement shown in FIG. 1 is intended for illustrative purposes only.

FIG. 2 shows a schematic cross-sectional view of a hybrid electrochemical cell 200 according to certain embodiments. The hybrid cell 200 includes a first electrochemical sub-cell 202, a second electrochemical sub-cell 208, an electrolyte cavity 214, a positive electrical terminal 216, a negative electrical terminal 218, and supporting structure 220. In some embodiments, the first electrochemical sub-cell 202 includes a positive electrochemical electrode unit 204 connected to the positive electrical terminal 216 and a negative electrochemical electrode unit 206 connected to the negative electrical terminal 218. In some embodiments, the second electrochemical sub-cell 208 includes a positive electrochemical electrode unit 210 connected to the positive electrical terminal 216 and a negative electrochemical electrode unit 212 connected to the negative electrical terminal 218. Supporting structure 220 may be any suitable structure which substantially encloses the first and second electrochemical sub-cells 202 and 208 and the electrolyte cavity 214. In certain embodiments, the positive electrical terminal 216 and the negative electrical terminal 218 penetrate the supporting structure 220 and provide an electrical connection to the exterior of the hybrid cell 200.

The first electrochemical sub-cell 202, second electrochemical sub-cell 208, electrolyte cavity 214, positive electrical terminal 216, negative electrical terminal 218, and supporting structure 220 may be similar to their counterparts in the hybrid electrochemical cell 100. For example, the first electrochemical sub-cell 202 may utilize a nickel-metal hydride chemistry, while the second electrochemical sub-cell 208 may be an ultracapacitor. Both the first and second electrochemical sub-cell 202 and 208 may share a common alkaline electrolyte in cavity 214. However, in the hybrid electrochemical cell 200, the electrodes of each electrochemical sub-cell are distributed throughout the hybrid cell 200. In particular, the positive electrode 204 of the first electrochemical sub-cell 202 may be positioned substantially between the negative electrode 212 and the positive electrode 210 of the second electrochemical cell 208. Such a configuration may be useful because the negative electrodes 206 and 212 are both arranged apart from the positive electrodes 204 and 210. In some implementations, a separator may electrically insulate the negative electrodes 206 and 212 from the positive electrodes 204 and 210. By grouping the negative electrodes 206 and 212 separately from the positive electrodes 204 and 210 in a distinct section of the hybrid cell 200, only a single separator may be required to insulate these two groups of electrodes, although in certain embodiments, more than one separator may be still be used.

Figure 3:
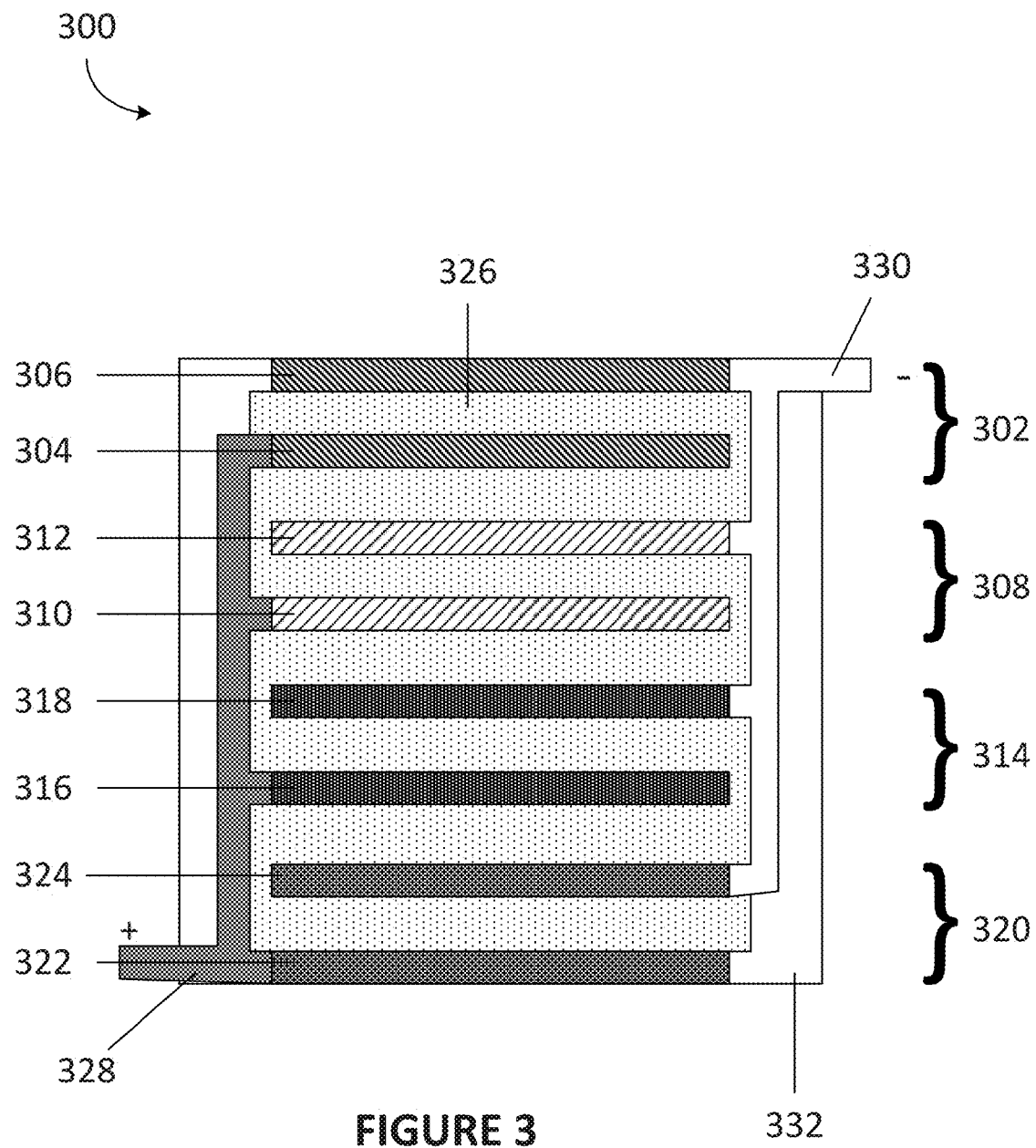
FIG. 3 shows a schematic cross-sectional view of a hybrid electrochemical cell with sub-cells of different chemistries.

FIG. 3 shows a schematic cross-sectional view of a hybrid electrochemical cell 300 according to certain embodiments. The hybrid cell 300 includes a first electrochemical sub-cell 302, a second electrochemical sub-cell 308, a third electrochemical sub-cell 314, a fourth electrochemical sub-cell 320, an electrolyte cavity 326, a positive electrical terminal 328, a negative electrical terminal 330, and supporting structure 332. In some embodiments, the first electrochemical sub-cell 302 includes a positive electrochemical electrode unit 304 connected to the positive electrical terminal 328 and a negative electrochemical electrode unit 306 connected to the negative electrical terminal 330. In some embodiments, the second electrochemical sub-cell 308 includes a positive electrochemical electrode unit 310 connected to the positive electrical terminal 328 and a negative electrochemical electrode unit 312 connected to the negative electrical terminal 330. In some embodiments, the third electrochemical sub-cell 314 includes a positive electrochemical electrode unit 316 connected to the positive electrical terminal 328 and a negative electrochemical electrode unit 318 connected to the negative electrical terminal 330. In some embodiments, the fourth electrochemical sub-cell 320 includes a positive electrochemical electrode unit 322 connected to the positive electrical terminal 328 and a negative electrochemical electrode unit 324 connected to the negative electrical terminal 330. Supporting structure 332 may be any suitable structure which substantially encloses the electrochemical sub-cells 302, 308, 314, and 320 and the electrolyte cavity 326. In certain embodiments, the positive electrical terminal 328 and the negative electrical terminal 330 penetrate the supporting structure 332 and provide an electrical connection to the exterior of the hybrid cell 300. The electrolyte cavity 326, positive electrical terminal 328, negative electrical terminal 330, and supporting structure 332 may be similar to their counterparts in the hybrid electrochemical cell 100 depicted in FIG. 1.

The electrochemical sub-cells 302, 308, 314, and 320 may be similar to the electrochemical sub-cells 102 and 108 discussed above in relation to FIG. 1. In particular, the electrochemical sub-cells 302, 308, 314, and 320 may each utilize any suitable battery type or battery technology. Furthermore, each of the electrochemical sub-cells 302, 308, 314, and 320 may utilize different battery chemistries, as depicted in FIG. 3. For example, the first electrochemical sub-cell 302 may utilize a nickel-metal hydride chemistry, the second electrochemical sub-cell 308 may utilize a nickel-cadmium chemistry, the third electrochemical sub-cell 314 may utilize a nickel-iron chemistry, while the fourth electrochemical sub-cell 320 may be a carbon ultracapacitor. All four electrochemical sub-cells 302, 308, 314, and 320 may share a common alkaline electrolyte, such as potassium hydroxide, through the electrolyte cavity 326.

By combining two or more battery types in a single enclosure, the hybrid cell 300 may benefit from the further advantages of the diverse chemistries which may not have been possible or practicable by using only a single chemistry. For example, as discussed in relation to FIG. 1, a carbon ultracapacitor may provide high-C discharge capability for a short period of time, while a nickel-metal hydride chemistry may be able to provide long-term capacity and charge the ultracapacitor when it is not in use. Adding a third and a fourth battery type, as depicted in FIG. 3, may further diversify the benefits added to the hybrid cell 300. For example, multiple types of ultracapacitors, each with their specific advantages and disadvantages, may be combined which a nickel-metal hydride chemistry to provide slightly different discharge speeds and capacities as fit for particular applications.

Although FIG. 3 depicts an illustrative example utilizing four different chemistries, any combination of two or more battery types may be utilized by electrochemical sub-cells 302, 308, 314, and 320, and such combinations and variations shall not depart from the scope of the information disclosed herein. For example, the first and second electrochemical sub-cells 302 and 308 may both utilize a nickel-metal hydride chemistry, while the third and fourth electrochemical sub-cells 314 and 320 may both be carbon ultracapacitors. Furthermore, the electrodes for sub-cells 302, 308, 314, and 320 may be distributed or arranged within the hybrid cell 300 in any suitable configuration. For example, the negative electrodes 306, 312, 318, and 324 may be grouped separately from the positive electrodes 304, 310, 316, and 322, similar in principle to the arrangement depicted in FIG. 2.

Figure 4:
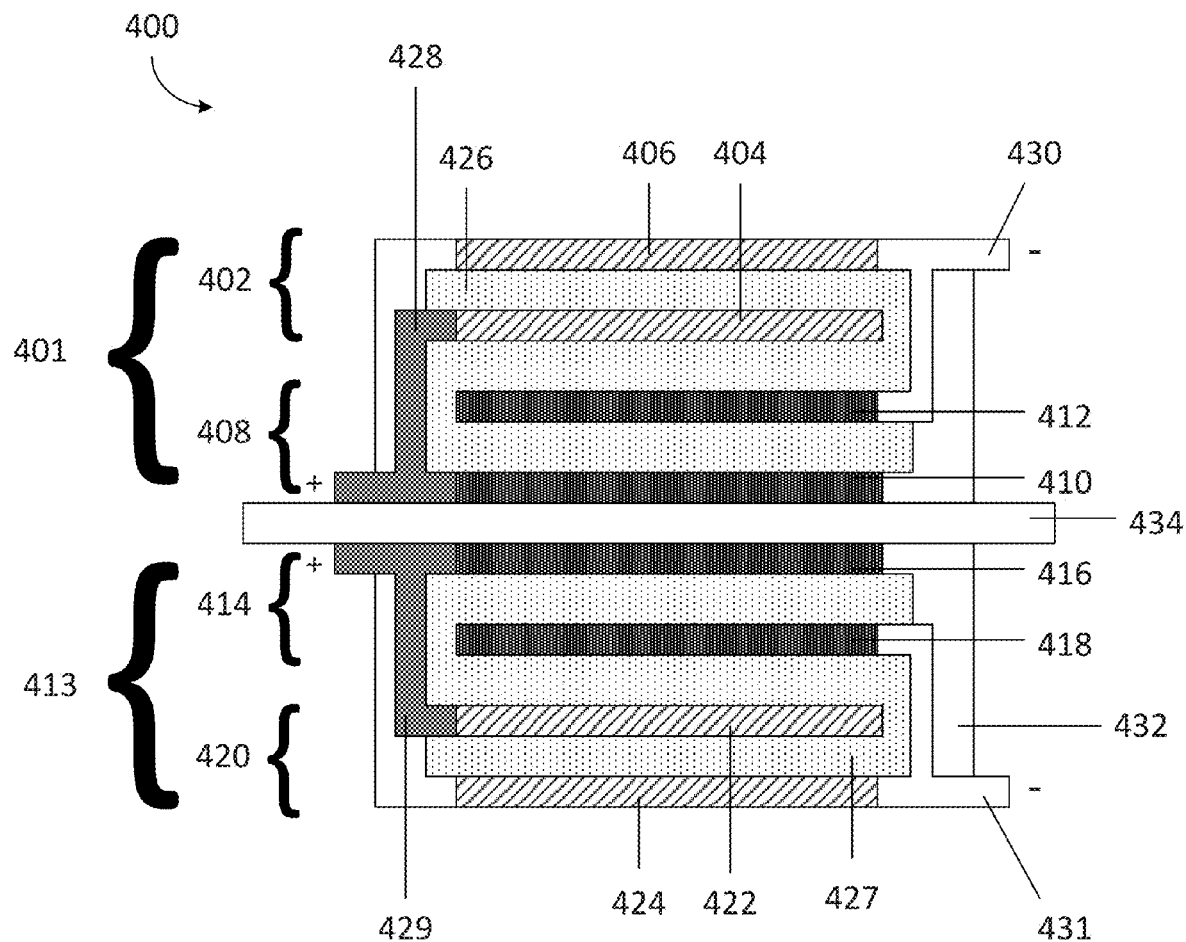
FIG. 4 shows two hybrid electrochemical cells connected electrically in parallel.

FIG. 4 shows a hybrid battery 400 with two hybrid electrochemical cells 401 and 413 connected electrically in parallel according to certain embodiments. The hybrid cell 401 includes a first electrochemical sub-cell 402, a second electrochemical sub-cell 408, a first electrolyte cavity 426, a positive terminal 428 and a negative terminal 430. The hybrid cell 408 includes a third electrochemical sub-cell 414, a fourth electrochemical sub-cell 420, a second electrolyte cavity 427, a positive terminal 429, and a negative terminal 431. The hybrid battery 400 also includes a supporting structure 432 and separator 434. The positive electrical terminals 428 and 429, the negative electrical terminals 430 and 431, and the supporting structure 432 may be similar to their counterparts in the hybrid electrochemical cell 100 depicted in FIG. 1.

In some embodiments, the first electrochemical sub-cell 402 includes a positive electrochemical electrode unit 404 connected to the positive electrical terminal 428 and a negative electrochemical electrode unit 406 connected to the negative electrical terminal 430. In some embodiments, the second electrochemical sub-cell 408 includes a positive electrochemical electrode unit 410 connected to the positive electrical terminal 428 and a negative electrochemical electrode unit 412 connected to the negative electrical terminal 430. The first and second electrochemical sub-cells 402 and 408 and electrolyte cavity 426 may be similar to their counterparts in hybrid electrochemical cell 100 depicted in FIG. 1.

In some embodiments, the third electrochemical sub-cell 414 includes a positive electrochemical electrode unit 416 connected to the positive electrical terminal 429 and a negative electrochemical electrode unit 418 connected to the negative electrical terminal 431. In some embodiments, the fourth electrochemical sub-cell 420 includes a positive electrochemical electrode unit 422 connected to the positive electrical terminal 429 and a negative electrochemical electrode unit 424 connected to the negative electrical terminal 431. The third and fourth electrochemical sub-cells 414 and 420 and electrolyte cavity 427 may be similar to their counterparts in hybrid electrochemical cell 100 depicted in FIG. 1.

The electrochemical sub-cells 402, 408, 414, and 420 may be similar to the electrochemical sub-cells 102 and 108 discussed above in relation to FIG. 1. In particular, the electrochemical sub-cells 402, 408, 414, and 420 may each utilize any suitable battery type or battery technology. Furthermore, each of the electrochemical sub-cells 402, 408, 414, and 420 may utilize different battery chemistries, as depicted in FIG. 3. For example, the first electrochemical sub-cell 402 may utilize a nickel-metal hydride chemistry, the second electrochemical sub-cell 408 may utilize a nickel-cadmium chemistry, the third electrochemical sub-cell 414 may utilize a nickel-iron chemistry, while the fourth electrochemical sub-cell 420 may be a carbon ultracapacitor. The first and second electrochemical sub-cells 402 and 408 may share a common alkaline electrolyte, such as potassium hydroxide, through electrolyte cavity 426. The third and fourth electrochemical sub-cells may also share a common alkaline electrolyte through electrolyte cavity 427. The electrolyte in electrolyte cavity 427 may be the same as in electrolyte cavity 426 (e.g., potassium hydroxide), or it may be a different electrolyte (e.g., sodium hydroxide).

By combining two or more battery types in a single enclosure, the hybrid battery 400 may benefit from the further advantages of the diverse chemistries which may not have been possible or practicable by using only a single chemistry. For example, as discussed in relation to FIG. 1, a carbon ultracapacitor may provide high-C discharge capability for a short period of time, while a nickel-metal hydride chemistry may be able to provide long-term capacity and charge the ultracapacitor when it is not in use. Adding a second hybrid cell 413, as depicted in FIG. 4, may further diversify the benefits added to the hybrid battery 400. For example, multiple types of ultracapacitors, each with their specific advantages and disadvantages, may be combined which a nickel-metal hydride chemistry to provide slightly different discharge speeds and capacities as fit for particular applications.

Although FIG. 4 depicts an illustrative example utilizing four different chemistries, any combination of two or more battery types may be utilized by electrochemical sub-cells 402, 408, 414, and 420, and such combinations and variations shall not depart from the scope of the information disclosed herein. For example, the first and third electrochemical sub-cells 402 and 414 may both utilize a nickel-metal hydride chemistry, while the second and fourth electrochemical sub-cells 408 and 420 may both be carbon ultracapacitors. Furthermore, the electrodes within each hybrid cell 401 and 413 may be distributed or arranged within their respective hybrid cells in any suitable configuration. For example, the positive electrode 404 may be located substantially between the electrodes 410 and 412, and the positive electrode 422 may be located substantially between electrodes 416 and 418, similar in principle to the arrangement depicted in FIG. 2.

In the illustrative example depicted in FIG. 4, hybrid cells 401 and 413 are arranged such that the positive terminals 428 and 429 are arranged on similar sides of the separator 434. In some embodiments, separator 434 is an electric insulator which hermetically seals hybrid cell 401 from hybrid cell 413. In such embodiments, the operator of the battery would have the choice of connecting to either hybrid cell 401, 413, or both. In other embodiments, separator 434 may be an electric conductor and allow an electric connection between the positive terminals 428 and 429. In such embodiments, an operator of the battery would be able to make a single connection to either the positive terminal 428 or the terminal 429 to connect to both hybrid cells. Furthermore, the hybrid cells 401 and 413 may be configured to operate at substantially the same voltage levels.

Figure 5:
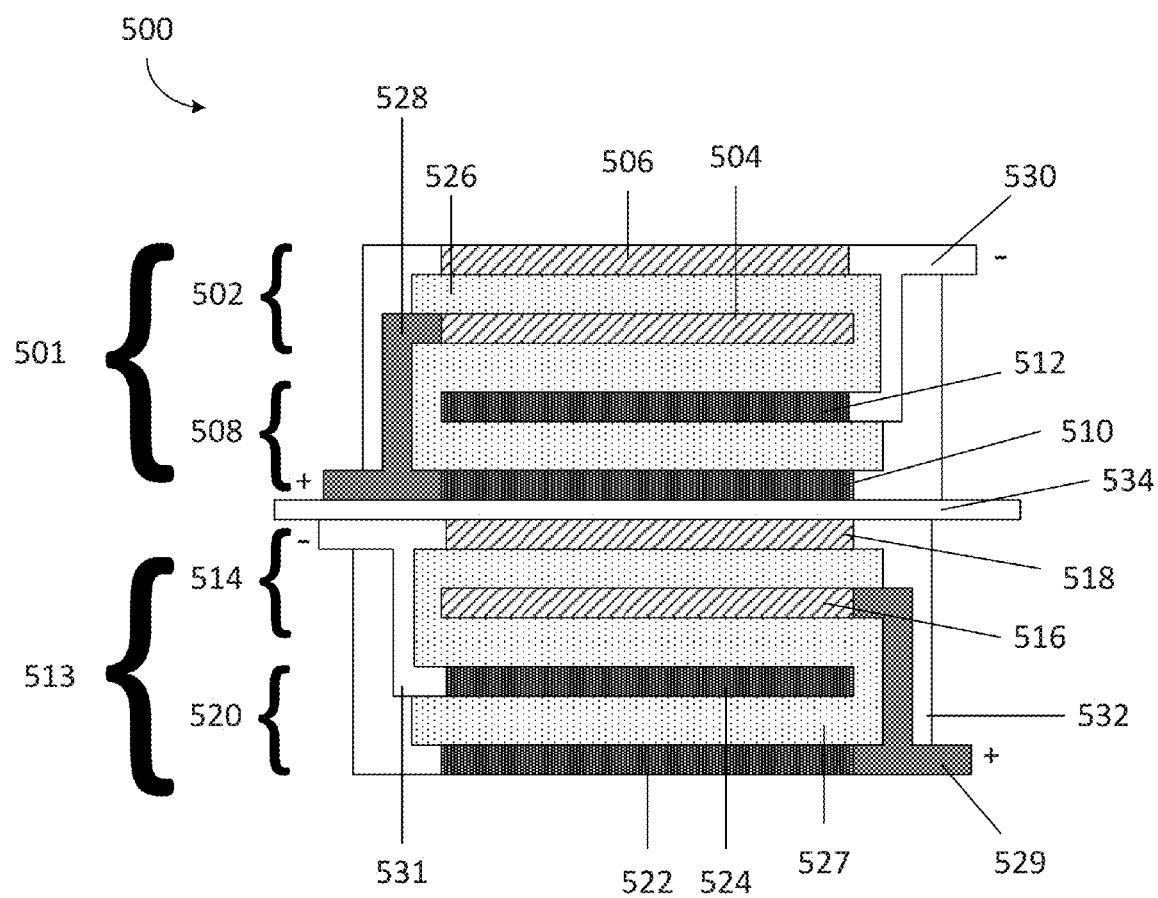
FIG. 5 shows two hybrid electrochemical cells connected electrically in series.

FIG. 5 shows a hybrid battery 500 with two hybrid electrochemical cells connected electrically in series according to certain embodiments. The hybrid cell 501 includes a first electrochemical sub-cell 502, a second electrochemical sub-cell 508, a first electrolyte cavity 526, a positive terminal 528 and a negative terminal 530. The hybrid cell 508 includes a third electrochemical sub-cell 514, a fourth electrochemical sub-cell 520, a second electrolyte cavity 527, a positive terminal 529, and a negative terminal 531. The hybrid battery 500 also includes a supporting structure 532 and separator 534. The positive electrical terminals 528 and 529, the negative electrical terminals 530 and 531, and the supporting structure 532 may be similar to their counterparts in the hybrid electrochemical cell 100 depicted in FIG. 1.

In some embodiments, the first electrochemical sub-cell 502 includes a positive electrochemical electrode unit 504 connected to the positive electrical terminal 528 and a negative electrochemical electrode unit 506 connected to the negative electrical terminal 530. In some embodiments, the second electrochemical sub-cell 508 includes a positive electrochemical electrode unit 510 connected to the positive electrical terminal 528 and a negative electrochemical electrode unit 512 connected to the negative electrical terminal 530. The first and second electrochemical sub-cells 502 and 508 and electrolyte cavity 526 may be similar to their counterparts in hybrid electrochemical cell 100 depicted in FIG. 1.

In some embodiments, the third electrochemical sub-cell 514 includes a positive electrochemical electrode unit 516 connected to the positive electrical terminal 529 and a negative electrochemical electrode unit 518 connected to the negative electrical terminal 531. In some embodiments, the fourth electrochemical sub-cell 520 includes a positive electrochemical electrode unit 522 connected to the positive electrical terminal 529 and a negative electrochemical electrode unit 524 connected to the negative electrical terminal 531. The third and fourth electrochemical sub-cells 514 and 520 and electrolyte cavity 527 may be similar to their counterparts in hybrid electrochemical cell 100 depicted in FIG. 1.

The electrochemical sub-cells 502, 508, 514, and 520 may be similar to the electrochemical sub-cells 102 and 108 discussed above in relation to FIG. 1. In particular, the electrochemical sub-cells 502, 508, 514, and 520 may each utilize any suitable battery type or battery technology. Furthermore, each of the electrochemical sub-cells 502, 508, 514, and 520 may utilize different battery chemistries, as depicted in FIG. 3. For example, the first electrochemical sub-cell 502 may utilize a nickel-metal hydride chemistry, the second electrochemical sub-cell 508 may utilize a nickel-cadmium chemistry, the third electrochemical sub-cell 514 may utilize a nickel-iron chemistry, while the fourth electrochemical sub-cell 520 may be a carbon ultracapacitor. The first and second electrochemical sub-cells 502 and 508 may share a common alkaline electrolyte, such as potassium hydroxide, through electrolyte cavity 526. The third and fourth electrochemical sub-cells may also share a common alkaline electrolyte through electrolyte cavity 527. The electrolyte in electrolyte cavity 527 may be the same as in electrolyte cavity 526 (e.g., potassium hydroxide), or it may be a different electrolyte (e.g., sodium hydroxide).

By combining two or more battery types in a single enclosure, the hybrid battery 500 may benefit from the further advantages of the diverse chemistries which may not have been possible or practicable by using only a single chemistry. For example, as discussed in relation to FIG. 1, a carbon ultracapacitor may provide high-C discharge capability for a short period of time, while a nickel-metal hydride chemistry may be able to provide long-term capacity and charge the ultracapacitor when it is not in use. Adding a second hybrid cell 513, as depicted in FIG. 5, may further diversify the benefits added to the hybrid battery 500. For example, multiple types of ultracapacitors, each with their specific advantages and disadvantages, may be combined which a nickel-metal hydride chemistry to provide slightly different discharge speeds and capacities as fit for particular applications.

Although FIG. 5 depicts an illustrative example utilizing four different chemistries, any combination of two or more battery types may be utilized by electrochemical sub-cells 502, 508, 514, and 520, and such combinations and variations shall not depart from the scope of the information disclosed herein. For example, the first and third electrochemical sub-cells 502 and 514 may both utilize a nickel-metal hydride chemistry, while the second and fourth electrochemical sub-cells 508 and 520 may both be carbon ultracapacitors. Furthermore, the electrodes within each hybrid cell 501 and 513 may be distributed or arranged within their respective hybrid cells in any suitable configuration. For example, the positive electrode 504 may be located substantially between the electrodes 510 and 512, and the positive electrode 522 may be located substantially between electrodes 516 and 518, similar in principle to the arrangement depicted in FIG. 2.

In the illustrative example depicted in FIG. 5, hybrid cells 501 and 513 are arranged such that the positive terminal 528 and negative terminal 531 are arranged on similar sides of the separator 534. In some embodiments, separator 534 is an electric insulator which hermetically seals hybrid cell 501 from hybrid cell 513. In such embodiments, the operator of the battery would have the choice of connecting to either hybrid cell 501, 513, or both. In other embodiments, separator 534 may be an electric conductor and allow an electric connection between the positive terminal 528 and the negative terminal 531. In such embodiments, the voltage of the hybrid cells may be added, and an operator of the battery would be able to make a single connection to the hybrid battery 500 by connecting to positive terminal 529 and negative terminal 530.

Figure 6:
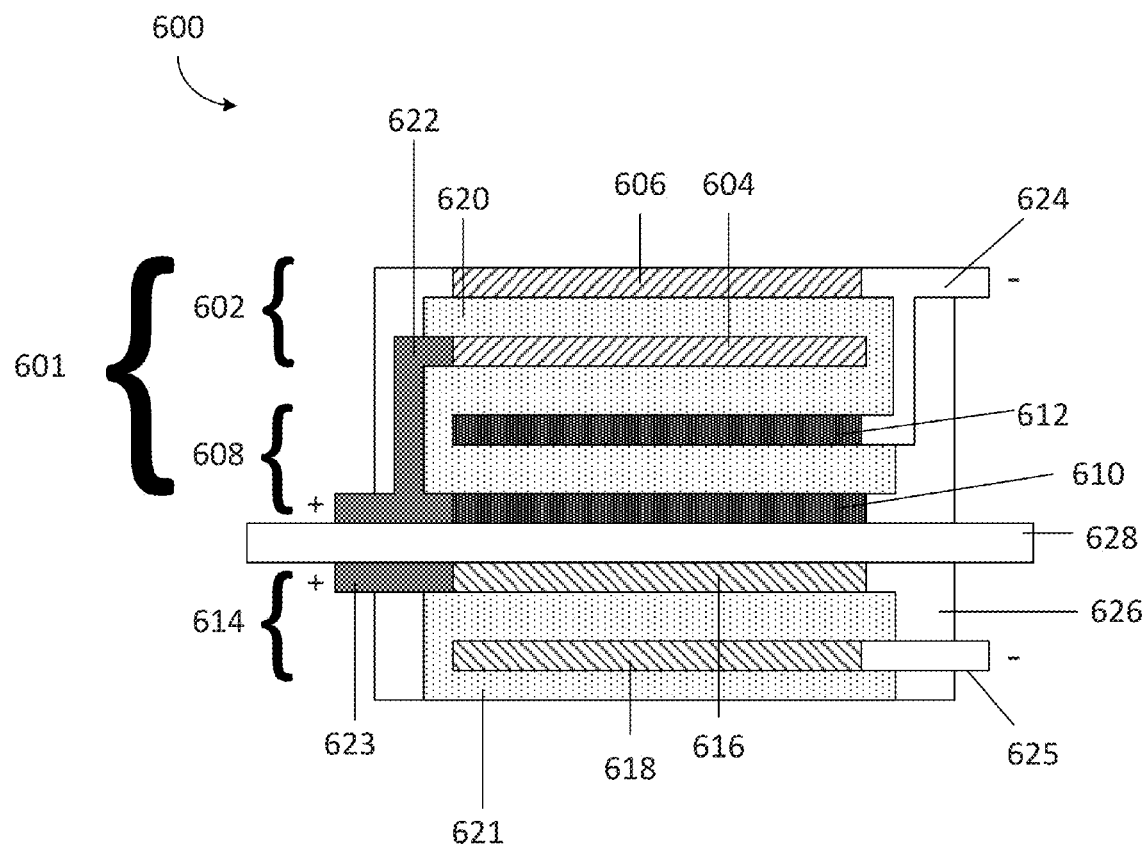
FIG. 6 shows a hybrid electrochemical cell connected in parallel with a single-chemistry cell.

FIG. 6 shows a hybrid battery 600 comprising an electrochemical cell 601 connected in parallel with a single-chemistry electrochemical cell 614 according to certain embodiments. The hybrid cell 601 includes a first electrochemical sub-cell 602, a second electrochemical sub-cell 608, a first electrolyte cavity 620, a positive terminal 622 and a negative terminal 624. The electrochemical cell 614 includes a positive electrode 616, a negative electrode 618, a second electrolyte cavity 621, a positive terminal 623, and a negative terminal 625. The hybrid battery 600 also includes a supporting structure 626 and separator 628. The positive electrical terminals 622 and 623, the negative electrical terminals 624 and 625, and the supporting structure 626 may be similar to their counterparts in the hybrid electrochemical cell 100 depicted in FIG. 1.

In some embodiments, the first electrochemical sub-cell 602 includes a positive electrochemical electrode unit 604 connected to the positive electrical terminal 622 and a negative electrochemical electrode unit 606 connected to the negative electrical terminal 624. In some embodiments, the second electrochemical sub-cell 608 includes a positive electrochemical electrode unit 610 connected to the positive electrical terminal 622 and a negative electrochemical electrode unit 612 connected to the negative electrical terminal 624. The first and second electrochemical sub-cells 602 and 608 and electrolyte cavity 620 may be similar to their counterparts in hybrid electrochemical cell 100 depicted in FIG. 1.

In some embodiments, the electrochemical cell 614 and electrolyte cavity 621 may be similar to the first electrochemical sub-cell 102 and the electrolyte cavity 114 depicted in FIG. 1. In particular, electrochemical cell 614 may be any suitable battery type or battery chemistry, including, but not limited to, lead-acid, nickel-cadmium, lithium-ion, lithium-polymer, and or any other suitable chemistry.

The electrochemical sub-cells 602 and 608 may be similar to the electrochemical sub-cells 102 and 108 discussed above in relation to FIG. 1. In particular, the electrochemical sub-cells 602 and 608 may each utilize any suitable battery type or battery technology. For example, the first electrochemical sub-cell 602 may utilize a nickel-metal hydride chemistry, and the second electrochemical sub-cell 608 may be a carbon ultracapacitor. The first and second electrochemical sub-cells 602 and 608 may share a common alkaline electrolyte, such as potassium hydroxide, through electrolyte cavity 620. The electrolyte in electrolyte cavity 621 may be the same as in electrolyte cavity 622 (e.g., potassium hydroxide), or it may be a different electrolyte (e.g., sodium hydroxide).

In the illustrative example depicted in FIG. 6, hybrid cells 601 and 614 are arranged such that the positive terminals 622 and 623 are arranged on similar sides of the separator 628. In some embodiments, separator 628 is an electric insulator which hermetically seals hybrid cell 601 from hybrid cell 614. In such embodiments, the operator of the battery would have the choice of connecting to either hybrid cell 601, 614, or both. In other embodiments, separator 628 may be an electric conductor and allow an electric connection between the positive terminals 622 and 623. In such embodiments, an operator of the battery would be able to make a single connection to either the positive terminal 622 or the terminal 623 to connect to both hybrid cells. Furthermore, the hybrid cells 601 and 614 may be configured to operate at substantially the same voltage levels.

The foregoing is merely illustrative of the principles of the disclosure, and the systems, devices, and methods can be practiced by other than the described embodiments, which are presented for purposes of illustration and not of limitation. Variations and modifications will occur to those of skill in the art after reviewing this disclosure. The disclosed features may be implemented, in any combination and subcombinations (including multiple dependent combinations and subcombinations), with one or more other features described herein. The various features described or illustrated above, including any components thereof, may be combined or integrated in other systems. Moreover, certain features may be omitted or not implemented.

Examples of changes, substitutions, and alterations are ascertainable by one skilled in the art and could be made without departing from the scope of the information disclosed herein. All references cited herein are incorporated by reference in their entirety and made part of this application.

What is claimed is:

1. A hybrid energy storage cell comprising:
a first pair of electrode units forming a first electrochemical sub-cell, wherein the first electrochemical sub-cell is a nickel-metal hydride electrochemical sub-cell;
a second pair of electrode units forming a second electrochemical sub-cell, wherein the second electrochemical sub-cell utilizes a different chemical reaction than the first electrochemical sub-cell; and
a common electrolyte layer provided between each pair of electrode units, wherein an electrolyte is shared between the first electrochemical sub-cell and the second electrochemical sub-cell.

2. The energy storage cell of claim 1,
wherein the first pair of electrode units comprises a first positive electrochemical electrode unit and an adjacent first negative electrochemical electrode unit,
wherein the second pair of electrode units comprises a second positive electrochemical electrode unit and an adjacent second negative electrochemical electrode unit, and
wherein each of the electrochemical electrodes units of the same polarity are electrically coupled together in parallel.

3. The hybrid energy storage cell of claim 2, wherein the positive electrochemical electrode units are electrically isolated by a separator from the negative electrochemical electrode units.

4. The hybrid energy storage cell of claim 1, wherein the first electrochemical sub-cell and the second electrochemical sub-cell are contained in a single package, and wherein the electrolyte layer comprises a single cavity.

5. The hybrid energy storage device of claim 1, wherein the first electrochemical sub-cell and the second electrochemical sub-cell are electrically coupled in series.

6. The hybrid energy storage device of claim 1, wherein the first electrochemical sub-cell and the second electrochemical sub-cell are electrically coupled in parallel.

7. The hybrid energy storage device of claim 1, wherein the first electrochemical sub-cell is configured to operate at a substantially similar voltage range as the second electrochemical sub-cell.

8. The hybrid energy storage cell of claim 1, wherein the second electrochemical sub-cell comprises an electrochemical capacitor.

9. The hybrid energy storage cell of claim 1, wherein the second electrochemical sub-cell is configured to discharge at a rate greater than the first electrochemical sub-cell.

10. The hybrid energy storage cell of claim 1, wherein the first electrochemical sub-cell is configured to have a greater electrical storage capacity than the second electrochemical sub-cell.

11. A hybrid energy storage cell comprising:
a first pair of electrode units forming a nickel-metal hydride electrochemical sub-cell;
a second pair of electrode units forming a carbon electrochemical capacitor; and
a common electrolyte layer provided between each pair of electrode units, wherein an alkaline electrolyte is shared between the nickel-metal hydride electrochemical sub-cell and the carbon electrochemical capacitor.

12. The hybrid energy storage cell of claim 11,
wherein the first pair of electrode units comprises a first positive electrochemical electrode unit and an adjacent first negative electrochemical electrode unit,
wherein the second pair of electrode units comprises a second positive electrochemical electrode unit and an adjacent second negative electrochemical electrode unit, and
wherein each of the electrochemical electrodes units of the same polarity are electrically coupled together in parallel.

13. The hybrid energy storage cell of claim 12, wherein the positive electrochemical electrode units are electrically isolated by a separator from the negative electrochemical electrode units.

14. The hybrid energy storage cell of claim 11, wherein the nickel-metal hydride electrochemical sub-cell and the carbon electrochemical capacitor are contained in a single package, and wherein the electrolyte layer comprises a single cavity.

15. The hybrid energy storage device of claim 11, wherein the nickel-metal hydride electrochemical sub-cell and the carbon electrochemical capacitor are electrically coupled in series.

16. The hybrid energy storage device of claim 11, wherein the nickel-metal hydride electrochemical sub-cell and the carbon electrochemical capacitor are electrically coupled in parallel.

17. The hybrid energy storage device of claim 11, wherein the nickel-metal hydride electrochemical sub-cell is configured to operate at a substantially similar voltage range as the carbon electrochemical capacitor.

18. The hybrid energy storage cell of claim 11, wherein the carbon electrochemical capacitor is configured to discharge at a rate greater than the nickel-metal hydride electrochemical sub-cell.

19. The hybrid energy storage cell of claim 11, wherein the nickel-metal hydride electrochemical sub-cell is configured to have a greater electrical storage capacity than the carbon electrochemical capacitor.

* * * * *